US010026022B2

(12) United States Patent
Asati et al.

(10) Patent No.: US 10,026,022 B2
(45) Date of Patent: *Jul. 17, 2018

(54) FACE RECOGNITION IN BIG DATA ECOSYSTEM USING MULTIPLE RECOGNITION MODELS

(71) Applicant: International Business Machines Corporation, Armonk, NY (US)

(72) Inventors: Somnath Asati, Chhatarpur (IN); Soma Shekar Naganna, Bangalore (IN); Abhishek Seth, Uttar Pradesh (IN); Vishal Tomar, Meerut (IN); Shashidhar R. Yellareddy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,917

(22) Filed: Sep. 8, 2017

(65) Prior Publication Data

US 2018/0039869 A1    Feb. 8, 2018

Related U.S. Application Data

(63) Continuation of application No. 15/228,767, filed on Aug. 4, 2016.

(51) Int. Cl.
*G06K 9/62* (2006.01)
*G06K 9/66* (2006.01)
(Continued)

(52) U.S. Cl.
CPC .......... *G06K 9/66* (2013.01); *G06F 17/3028* (2013.01); *G06F 17/30256* (2013.01);
(Continued)

(58) Field of Classification Search
CPC .......... G06K 9/00281; G06K 9/00771; G06K 9/00221; G06K 9/00295
(Continued)

(56) References Cited

U.S. PATENT DOCUMENTS

| 7,027,054 | B1 | 4/2006 | Cheiky et al. |
| 7,187,787 | B2 * | 3/2007 | Milne ............... G06F 17/30247 340/5.82 |

(Continued)

FOREIGN PATENT DOCUMENTS

| CN | 102222283 A | 10/2011 |
| CN | 102609733 B | 4/2014 |

OTHER PUBLICATIONS

Hwang, Face Recognition System Using Multiple Face Model of Hybrid Fourier Feature Under Uncontrolled Illumination Variation, IEEE Transactions on Image Processing (vol. 20 , Issue: 4 ) , Oct. 4, 2010.

(Continued)

*Primary Examiner* — Yosef Kassa
(74) *Attorney, Agent, or Firm* — North Shore Patents, P.C.; Joseph L. Acayan (57) ABSTRACT

A system trains a facial recognition modeling system using an extremely large data set of facial images, by distributing a plurality of facial recognition models across a plurality of nodes within the facial recognition modeling system. The system optimizes a facial matching accuracy of the facial recognition modeling system by increasing a facial image set variance among the plurality of facial recognition models. The system selectively matches each facial image within the extremely large data set of facial images with at least one of the plurality of facial recognition models. The system reduces the time associated with training the facial recognition modeling system by load balancing the extremely large data set of facial images across the plurality of facial (Continued)

recognition models while improving the facial matching accuracy associated with each of the plurality of facial recognition models.

9 Claims, 5 Drawing Sheets

(51) Int. Cl.
 *G06F 17/30* (2006.01)
 *G06K 9/00* (2006.01)
(52) U.S. Cl.
 CPC ....... *G06K 9/00221* (2013.01); *G06K 9/6214* (2013.01); *G06K 9/6248* (2013.01); *G06K 9/6256* (2013.01)
(58) Field of Classification Search
 USPC ........ 382/115, 117, 118, 128, 156, 157, 159, 382/209, 278; 340/5.81, 5.83
 See application file for complete search history.

(56) References Cited

U.S. PATENT DOCUMENTS

| | | | | |
|---|---|---|---|---|
| 7,277,891 B2 * | 10/2007 | Howard | ............ | G06K 9/00006 707/707 |
| 7,519,200 B2 * | 4/2009 | Gokturk | ............ | G06F 17/30253 382/118 |
| 7,551,755 B1 * | 6/2009 | Steinberg | ............ | G06K 9/00228 340/5.53 |
| 7,634,662 B2 * | 12/2009 | Monroe | ............ | G06K 9/00221 382/117 |
| 7,668,348 B2 * | 2/2010 | Shah | ............ | G06K 9/00288 382/118 |
| 7,831,069 B2 * | 11/2010 | Shah | ............ | G06K 9/03 382/118 |
| 8,068,636 B2 | 11/2011 | Rodriguez et al. | | |
| 8,199,980 B2 * | 6/2012 | Shah | ............ | G06K 9/03 382/118 |
| 8,311,294 B2 * | 11/2012 | Myers | ............ | G06K 9/00288 382/118 |
| 8,358,811 B2 | 1/2013 | Adams et al. | | |
| 8,370,639 B2 | 2/2013 | Azar et al. | | |
| 8,390,669 B2 * | 3/2013 | Catchpole | ............ | G06K 9/00288 348/14.08 |
| 8,509,472 B2 | 8/2013 | Rodriguez et al. | | |
| 8,553,037 B2 | 10/2013 | Smith et al. | | |
| 8,831,294 B2 * | 9/2014 | Krupka | ............ | G06K 9/00677 382/118 |
| 9,275,269 B1 | 3/2016 | Li et al. | | |

OTHER PUBLICATIONS

Kasar, Multiple Face Model Recognition of Hybrid Discrete Wavelet Transform and Density based Score fusion Technique under Uncontrolled Illumination Variation, International Journal of Scientific & Engineering Research, vol. 5, Issue 4, Apr. 2014, IJSER.org.

List of IBM Patents or Applications Treated as Related.

Lu, Ensemble-based discriminant learning with boosting for face recognition, IEEE Transactions on Neural Networks (vol. 17, Issue: 1 ), Jan. 2006.

Turk, Face Recognition Using Eigenfaces, Vision and Modeling Group, The Media Laboratory Massachusetts Institute of Technology.

Yang, Parallel Face Recognition Approach based on LGBPHS with Homogeneous PC Cluster, Journal of Information & Computational Science 7: 3 (2010), JOICS.com.

* cited by examiner

FACE RECOGNITION IN BIG DATA ECOSYSTEM USING MULTIPLE RECOGNITION MODELS

BACKGROUND

Facial recognition algorithms compare each new facial image with each of the other facial images in a database to find a match. This one-to-one matching makes it very difficult to scale facial recognition systems to extremely large data sets referred to as "big data". Therefore, it would be helpful to implement facial recognition systems within a big data infrastructure.

SUMMARY

According to an embodiment of the present invention, in a method for training a facial recognition modeling system using an extremely large data set of facial images, the method distributes a plurality of facial recognition models across a plurality of nodes within the facial recognition modeling system. The method optimizes a facial matching accuracy of the facial recognition modeling system by increasing a facial image set variance among the plurality of facial recognition models.

In an example embodiment, when the method distributes the plurality of facial recognition models across the plurality of nodes in the facial recognition modeling system, the method provides a variety of facial recognition models for the plurality of facial recognition models where the plurality of facial recognition models operate independently from each other.

In an example embodiment, when the method distributes the plurality of facial recognition models across the plurality of nodes in the facial recognition modeling system, the method allows each of the plurality of facial recognition models to determine when re-training of the facial recognition model is required.

In an example embodiment, when the method distributes the plurality of facial recognition models across the plurality of nodes in the facial recognition modeling system, the method allows each of the plurality of facial recognition models to determine when to split a single facial recognition model into at least two facial recognition models.

In an example embodiment, when the method distributes the plurality of facial recognition models across the plurality of nodes in the facial recognition modeling system, the method assigns a facial characteristic recognition task to at least one specialty model in the plurality of facial recognition models.

In an example embodiment, when the method assigns the facial characteristic recognition task to at least one specialty model in the plurality of facial recognition models, the method detects a facial characteristic in at least one facial image of the extremely large data set of facial images. The method inserts at least one facial image into at least one specialty model to increase the facial matching accuracy of at least one specialty model with respect to the facial characteristic.

In an example embodiment, when the method optimizes the facial matching accuracy of the facial recognition modeling system by increasing the facial image set variance among the plurality of facial recognition models, the method increases a facial matching model accuracy associated with each of the plurality of facial recognition models by selectively matching each facial image within the extremely large data set of facial images with at least one of the plurality of facial recognition models.

In an example embodiment, when the method increases the facial matching model accuracy associated with each of the plurality of facial recognition models, the method computes a correlation between a dataset facial image within the extremely large data set of facial images and a most closely matching facial image within each of the plurality of facial recognition models. The method determines a least closely matching facial image associated with a farthest correlation between the dataset facial image and each of the most closely matching facial images. The method then inserts the dataset facial image into the facial recognition model associated with the least closely matching facial image.

In an example embodiment, when the method increases the facial matching model accuracy associated with each of the plurality of facial recognition models, the method calculates an eigenvector distance between a dataset facial image within the extremely large data set of facial images and a most closely matching facial image within each of the plurality of facial recognition models. The method determines a least closely matching facial image associated with a maximum eigenvector distance between the dataset facial image and each of the most closely matching facial images. The method inserts the dataset facial image into the facial recognition model associated with the least closely matching facial image.

In an example embodiment, when the method increases the facial matching model accuracy associated with each of the plurality of facial recognition models, the method reduces a time associated with a training of the facial recognition modeling system by load balancing the extremely large data set of facial images across the plurality of facial recognition models while improving the facial matching accuracy associated with each of the plurality of facial recognition models.

DETAILED DESCRIPTION

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
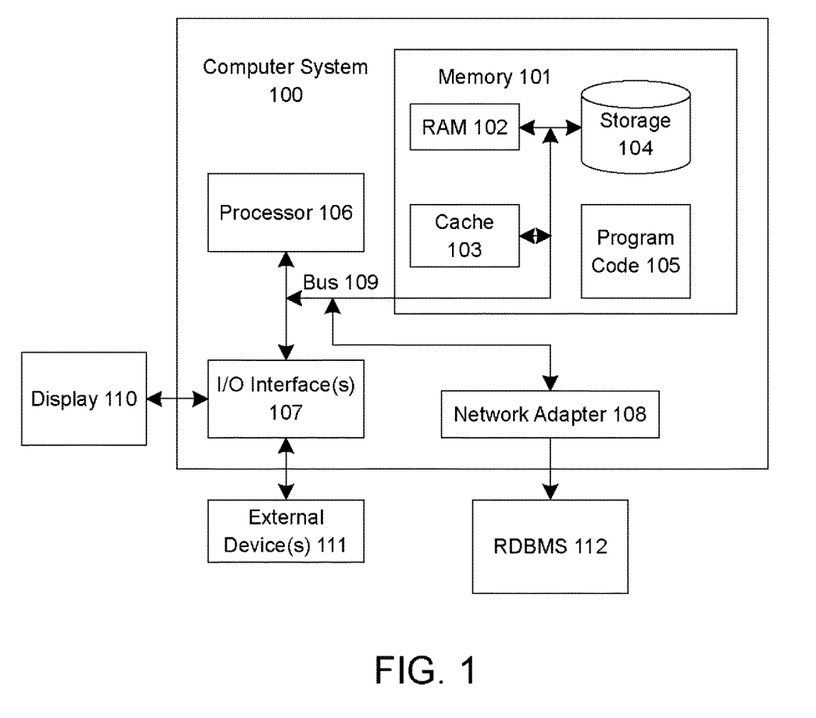
FIG. 1 illustrates an embodiment of a system for training a facial recognition modeling system using an extremely large data set of facial images, according to embodiments disclosed herein.

FIG. 1 illustrates a system for sorting for training a facial recognition modeling system using an extremely large data set of facial images according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
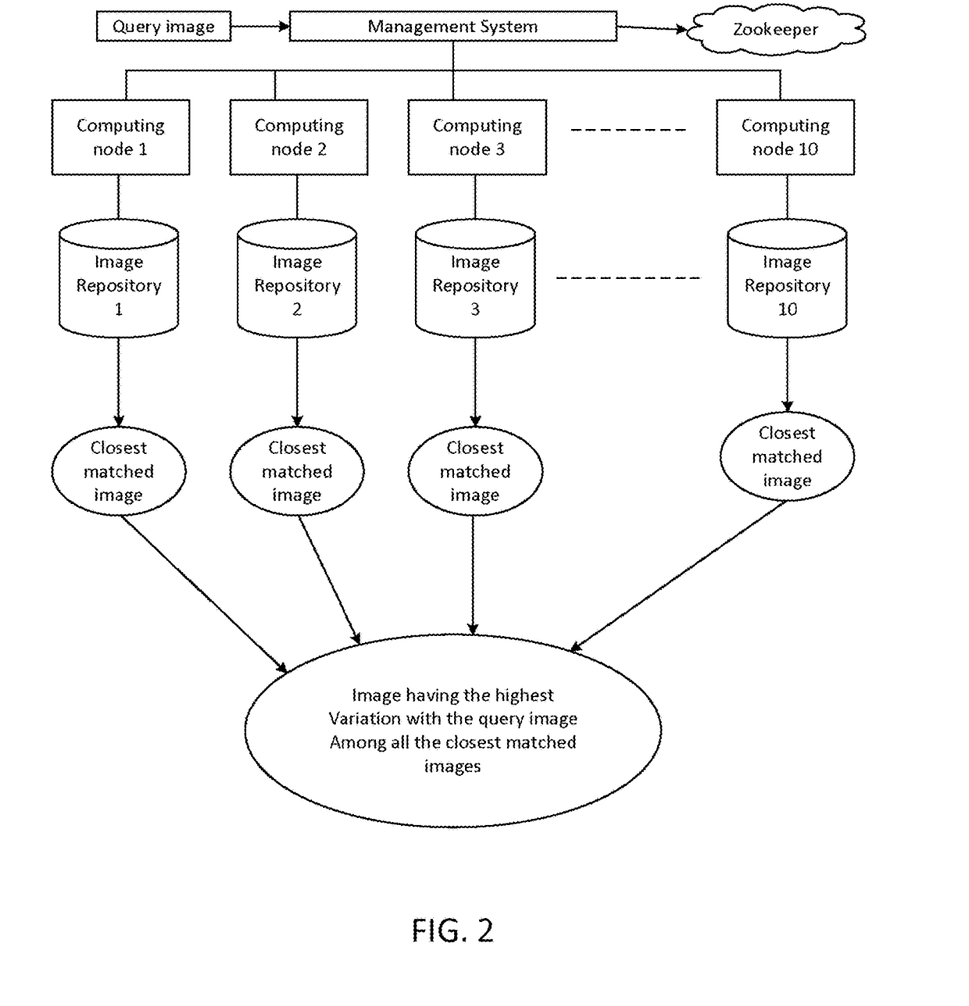
FIG. 2 is an example representation of an external architecture of a system for training a facial recognition modeling system using an extremely large data set of facial images, according to embodiments disclosed herein.

FIG. 2 is an example representation of an external architecture of a system for training a facial recognition modeling system using an extremely large data set of facial images, according to embodiments disclosed herein. On each of the computing nodes, one of the plurality of facial recognition models resides, along with an image repository. As a query image is inserted into a management system, the method identifies the closest matching facial image in each of the plurality of facial recognition models. From that set of closest matching facial images, the method selects the facial image having the highest variation with the query image. The method then inserts the query image into the facial recognition model associated with the facial image having the highest variation with the query image.

Figure 3:
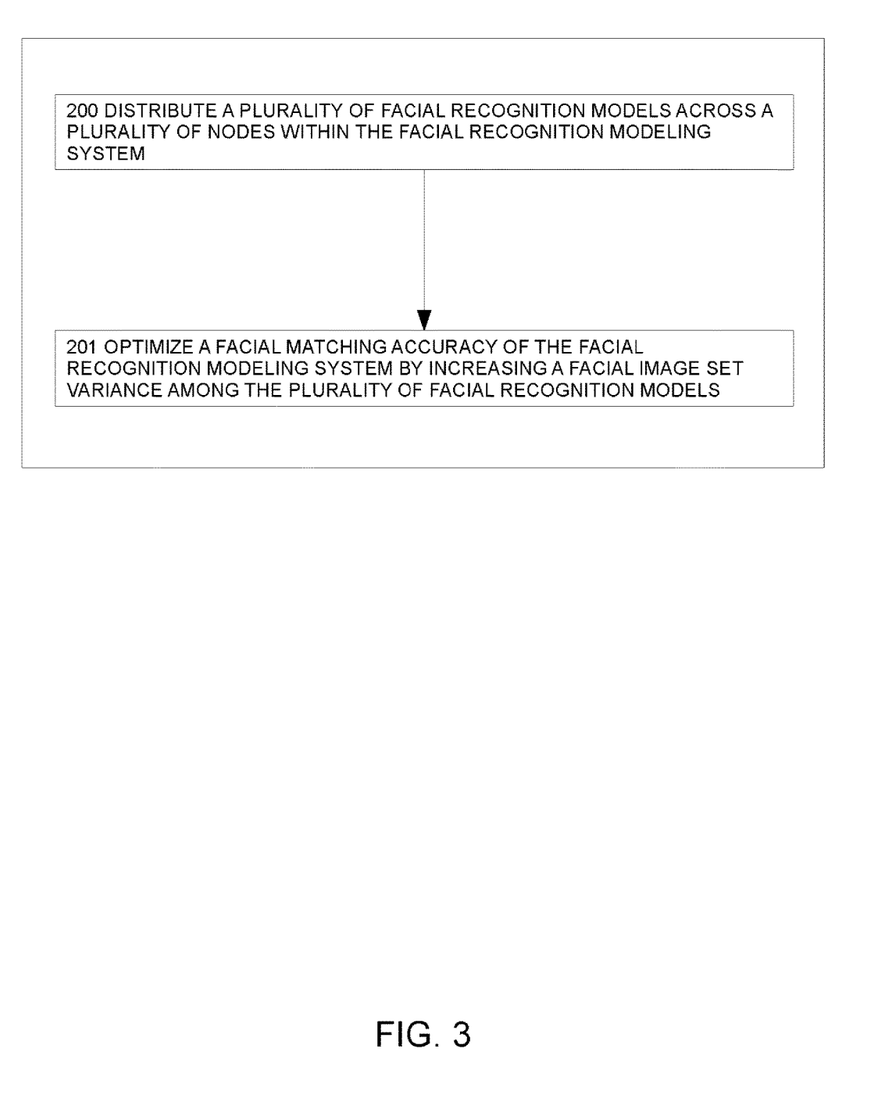
FIG. 3 is a flowchart illustrating an embodiment of a method for training a facial recognition modeling system using an extremely large data set of facial images, according to embodiments disclosed herein.

FIG. 3 illustrates an embodiment of a method for training a facial recognition modeling system using an extremely large data set of facial images. At 200, the method distributes a plurality of facial recognition models across a plurality of nodes within the facial recognition modeling system. At a high level, facial recognition systems match facial images by comparing a new facial image with one of the facial images in a training set associated with the facial recognition system to find a match, or to assess how close an existing facial image in the training set is to the new facial image. A large scale facial recognition system may contain, for example, a billion facial images. Attempting to match each new image to each of the billion facial images would not be efficient. To address this problem, the method distributes a plurality of facial recognition models across a plurality of nodes within the facial recognition modeling system. Each of the facial recognition models is trained using a subset of the billion of facial images. This reduces the overall training time of the facial recognition modeling system, yet does not impact the accuracy of each of the facial recognition models, or the accuracy of the facial recognition modeling system as a whole, because each of the facial recognition models is trained using a very large set of facial images (yet still a subset of the billion facial images). In an example embodiment, the facial recognition models may be implemented within a Hadoop cluster. The facial recognition models may be implemented across multiple nodes and across multiple machines.

At 201, the method optimizes a facial matching accuracy of the facial recognition modeling system by increasing a facial image set variance among the plurality of facial recognition models. The method builds up the training sets of each of the facial recognition models by inserting facial images into each of the facial recognition models. The variance between the facial image and the training set indicates how close the facial image is to the set of facial images within the training set. The lower the variance, the closer a match the facial image is to the set of facial images within the training set. The higher the variance, the more dissimilar the facial image is compared to the set of facial images within the training set. The method inserts the facial image into the facial recognition model where there is the highest variance between the facial image and the training set of the facial recognition model to insure that the facial recognition model will have a more diverse sample. As the method inserts facial images into the training sets, the method increases the overall accuracy of the facial recognition modeling system by increasing the variance among each of the plurality of facial recognition models, while at the same time, automatically load balancing the billions of images across the plurality of facial recognition models. For example, if a first facial recognition model has many more images than a second facial recognition model, the first facial recognition model is likely to have a closer match to the facial image (i.e., a lower variance) than the second facial recognition model (i.e., a higher variance) due to the sheer number of images in the first facial recognition model. The method inserts the facial image into the facial recognition model with the higher variance (i.e., the second facial recognition model), which is also the facial recognition model with fewer images. Thus, in increasing the variance among the plurality of facial recognition models, the method also automatically load balances the facial images among the facial recognition models. The response time of the facial recognition process is also increased as a result of load balancing the billions of images across the plurality of facial recognition models.

Figure 4:
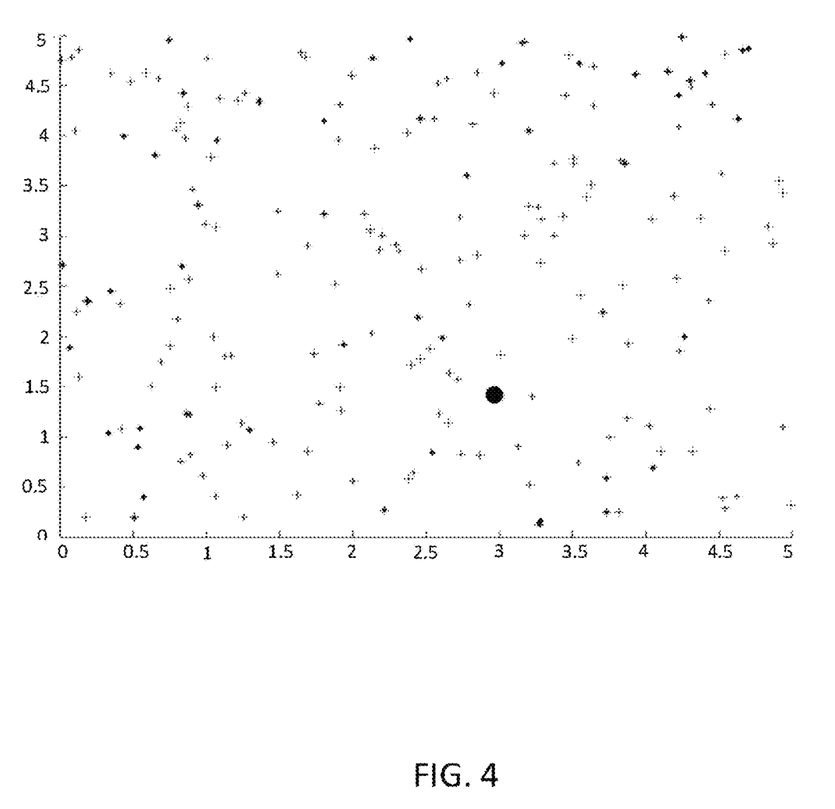
FIG. 4 illustrates an example explanation of load balancing using two dimensional vectors/points, according to embodiments disclosed herein.

FIG. 4 illustrates an example explanation of load balancing using two dimensional vectors/points, according to embodiments disclosed herein. For simplicity, the eigenfaces subspace is represented in two dimensions. The eigenfaces illustrated in FIG. 4 represent two Hadoop nodes, although in practice multiple Hadoop nodes may be involved. Each facial image in the facial recognition model is represented in FIG. 4 by a point in the two dimensional space (X and Y coordinates). The points illustrated with "+" represent facial images in a first node, and the points illustrated by "*" represent facial images in a second node. Thus, each facial image is represented by a point in the two dimensional space with two weights that are X and Y coordinates. In FIG. 4, the number of "+" are significantly higher than number of "*", indicating that the number of facial images in the first node are significantly higher than in the second node. When the method inserts a facial image "A" (represented by a solid circle in FIG. 4), the facial images closer to "A" are mostly represented by "+", and therefore associated with the first node. This is due to the sheer number of images in the first node. When the method calculates the maximum distance with the closest facial image, the result is an image from the second node. The method then inserts facial image "A" into the second node, thereby load balancing between the first node and the second node. The load balancing is independent of the (X,Y) position of facial image "A" because more often, the position of facial image "A" will be closer to the first node (due to a higher number of facial images in the first node), and therefore will be inserted into the second node (fewer facial images).

In an example embodiment, when the method distributes the plurality of facial recognition models across the plurality of nodes in the facial recognition modeling system, the method provides a variety of facial recognition models for the plurality of facial recognition models. In one example embodiment, the plurality of facial recognition models may operate independently from each other. In another example embodiment, the plurality of facial recognition models may operate jointly. There may exist different training models on different systems. There may also be different training sets shared across different nodes. The same facial recognition algorithm may be used on each of the nodes, even though each of the nodes may have a different training set.

In an example embodiment, when the method distributes the plurality of facial recognition models across the plurality of nodes in the facial recognition modeling system, the method allows each of the plurality of facial recognition models to determine when re-training of the facial recognition model is required. Facial recognition systems are trained using the training sets. Various algorithms may be used to enable the facial recognition modeling system to learn from those training sets so that the system can determine accurate matches when a facial image is introduced into the system. In an example embodiment, as the method adds facial images to each of the facial recognition models, the method may determine that re-training the facial recognition model is necessary. Re-training may be required after a pre-determined number of images have been added to the facial recognition model. Re-training may be required when the variance for the facial recognition model has dipped below a pre-determined variance threshold. This pre-determined variance threshold may be user defined, or may be determined during the re-training process. Re-training may also be required when the variance for the facial recognition model is low as compared to the other facial recognition models. When the facial recognition model is re-trained, the facial images that have been inserted into the facial recognition model by the method are incorporated into the re-training process to increase the accuracy and robustness of the facial recognition model, and to increase the variance of the facial recognition model. In an example embodiment, the method calculates eigenvectors for the training set, and determines the variance by determining the vector distance between those training set eigenvectors and eigenvectors associated with the facial image. During the re-training process, the eigenvectors are recalibrated using all the images in the facial recognition model.

In an example embodiment, when the method distributes the plurality of facial recognition models across the plurality of nodes in the facial recognition modeling system, the method allows each of the plurality of facial recognition models to determine when to split a single facial recognition model into at least two facial recognition models. In an example embodiment, as the method adds facial images to each of the facial recognition model, the method may determine that the facial recognition model is reaching capacity for the number of images. Each facial recognition model may be limited by the physical capacity of the hardware on which the facial recognition model is operating. Thus, when the method determines that the facial recognition model is close to reaching physical capacity, the method may create a new facial recognition model, and insert a subset of the facial images (for example, half of the images in the facial recognition model) from the existing facial recognition model into the new facial recognition model. The method then trains the new facial recognition model using the subset of facial images. The capacity of the existing facial recognition model has now been reduced, allowing the method to continue to insert facial images into the existing facial recognition model. In another example embodiment, the method may determine that the variance in a facial recognition model has dipped below a predetermined variance threshold, and split the facial recognition model into at least two facial recognition models. Then, each of those facial recognition models would be re-trained with the images contained within them. Splitting the facial recognition model into at least two facial recognition models allows for more facial images to be inserted into the model. The method selects facial images to insert into the facial recognition models that increase the variance of the facial recognition models.

In an example embodiment, when the method distributes the plurality of facial recognition models across the plurality of nodes in the facial recognition modeling system, the method assigns a facial characteristic recognition task to at least one specialty model in the plurality of facial recognition models. For example, a facial recognition model may be assigned the task of facial recognition of facial images from a particular angle, or faces that are from a particular region of the world.

In an example embodiment, when the method assigns the facial characteristic recognition task to at least one specialty model in the plurality of facial recognition models, the method detects a facial characteristic in at least one facial image of the extremely large data set of facial images, and inserts the facial image into at least one specialty model to increase the facial matching accuracy of at least one specialty model with respect to the facial characteristic. For example, as noted above, the method may assign a facial recognition model the facial recognition task related to facial images taken from a particular angle. In this scenario, when the method determines that a facial image represents an image taken from that particular angle, the method inserts the facial image into the facial recognition model assigned with the facial characteristic recognition task.

In an example embodiment, when the method optimizes the facial matching accuracy of the facial recognition modeling system by increasing the facial image set variance among the plurality of facial recognition models, the method increases a facial matching model accuracy associated with each of the plurality of facial recognition models by selectively matching each facial image within the extremely large data set of facial images with at least one of the plurality of facial recognition models. By selectively matching each facial image with one of the facial recognition models, the method increases the variance, and therefore the facial recognition accuracy of each facial recognition model, and also automatically load balances the extremely large data set of facial images across the plurality of facial recognition models. By inserting facial images into the facial recognition model that has a lower variance than the other facial recognition models, the method individually improves each facial recognition model, and therefore, improves the accuracy of all the facial recognition models.

In an example embodiment, when the method increases the facial matching model accuracy associated with each of the plurality of facial recognition models, the method computes a correlation between a dataset facial image within the extremely large data set of facial images and a most closely matching facial image within each of the plurality of facial recognition models. For each facial recognition model, the method determines the training set facial image (in that facial recognition model) that most closely matches the dataset facial image. The method determines a least closely matching facial image associated with a farthest correlation between the dataset facial image and each of the most closely matching facial images. In other words, from the set of the most closely matching training set facial images (selected from each of the facial recognition models), the method selects the training set facial image that least closely matches the dataset training image. The selected training set facial image is the least closely matching facial image. The method then inserts the dataset facial image into the facial recognition model associated with the least closely matching facial image (i.e., the facial recognition model that contains the least closely matching facial image).

Figure 5:
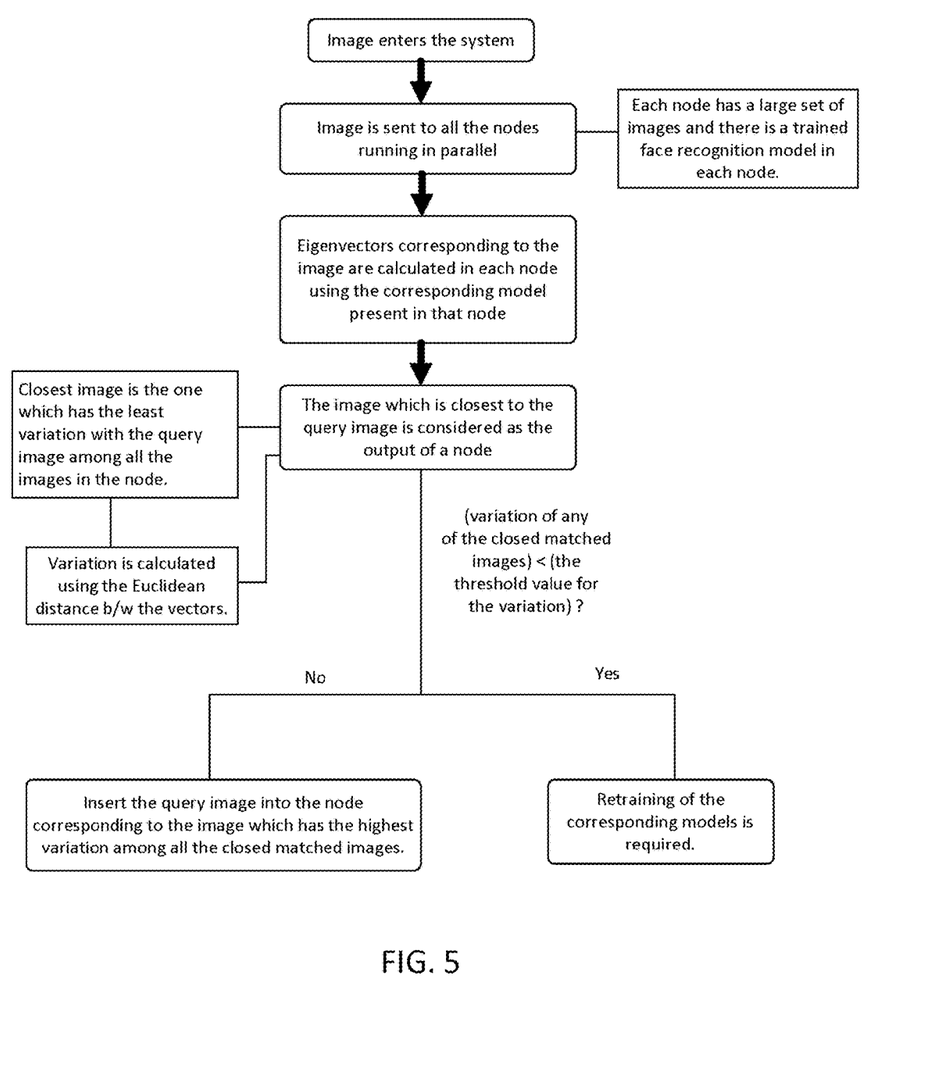
FIG. 5 is a flowchart illustrating an embodiment of a method for training a facial recognition modeling system using Eigenvectors, and an extremely large data set of facial images, according to embodiments disclosed herein.

In an example embodiment, when the method increases the facial matching model accuracy associated with each of the plurality of facial recognition models, the method calculates an eigenvector distance between a dataset facial image within the extremely large data set of facial images and a most closely matching facial image within each of the plurality of facial recognition models. As noted above, for each facial recognition model, the method determines the training set facial image (in that facial recognition model) that most closely matches the dataset facial image. The method makes this determination by calculating eigenvectors of the dataset facial image and each of the set of training set facial images that most closely match the dataset facial image. The method determines the least closely matching facial image associated with a maximum eigenvector distance between the dataset facial image and each of the most closely matching facial images. The method then inserts the dataset facial image into the facial recognition model associated with the least closely matching facial image. FIG. 5 is a flowchart illustrating an embodiment of a method for training a facial recognition modeling system using Eigenvectors, and an extremely large data set of facial images. As a query facial image enters the system, the method sends the facial image to all the nodes. Each node has a large set of facial images, and a trained facial recognition model. The method calculates eigenvectors corresponding to the query facial image at each node using the facial recognition model on that node. The method identifies the facial image that is closest to the query facial image for each node. The closest facial image is the facial image that has the least variation with the query facial image as compared to all the facial images residing at that node. The variation is calculated using the Euclidean distance between the eigenvectors. If the variation of the closest matched facial image is below a predetermined threshold value, the method determines that retraining of the facial recognition model is required. If the variation of the closest matched facial image is not below the predetermined threshold value, the method inserts the query image into the node that corresponds to the facial image that has the highest variation among the set of closest facial images for all of the nodes.

In an example embodiment, when the method increases the facial matching model accuracy associated with each of the plurality of facial recognition models, the method reduces a time associated with a training of the facial recognition modeling system by load balancing the extremely large data set of facial images across the plurality of facial recognition models while improving the facial matching accuracy associated with each of the plurality of facial recognition models. The overall training time of the facial recognition modeling system is reduced by training the facial recognition models in parallel with subsets of the extremely large data set of facial images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a facial recognition modeling system using an extremely large data set of facial images, the method comprising:
    distributing a plurality of facial recognition models across a plurality of nodes within the facial recognition modeling system;
    optimizing a facial matching accuracy of the facial recognition modeling system by increasing a facial image set variance among the plurality of facial recognition models;
    calculating an eigenvector distance between a dataset facial image within the extremely large data set of facial images and a most closely matching facial image within each of the plurality of facial recognition models;
    determining a least closely matching facial image associated with a maximum eigenvector distance between the dataset facial image and each of the most closely matching facial images; and
    inserting the dataset facial image into the facial recognition model associated with the least closely matching facial image.

2. The method of claim 1 wherein distributing the plurality of facial recognition models across the plurality of nodes in the facial recognition modeling system comprises:
    providing a variety of facial recognition models for the plurality of facial recognition models wherein the plurality of facial recognition models operate independently from each other.

3. The method of claim 1 wherein distributing the plurality of facial recognition models across the plurality of nodes in the facial recognition modeling system comprises:
    allowing each of the plurality of facial recognition models to determine when re-training of the facial recognition model is required.

4. The method of claim 1 wherein distributing the plurality of facial recognition models across the plurality of nodes in the facial recognition modeling system comprises:
    allowing each of the plurality of facial recognition models to determine when to split a single facial recognition model into at least two facial recognition models.

5. The method of claim 1 wherein distributing the plurality of facial recognition models across the plurality of nodes in the facial recognition modeling system comprises:
    assigning a facial characteristic recognition task to at least one specialty model in the plurality of facial recognition models.

6. The method of claim 5 wherein assigning the facial characteristic recognition task to the at least one specialty model in the plurality of facial recognition models comprises:
    detecting a facial characteristic in at least one facial image of the extremely large data set of facial images; and
    inserting the at least one facial image into the at least one specialty model to increase the facial matching accuracy of the at least one specialty model with respect to the facial characteristic.

7. The method of claim 1 wherein optimizing the facial matching accuracy of the facial recognition modeling system by increasing the facial image set variance among the plurality of facial recognition models comprises:
    increasing a facial matching model accuracy associated with each of the plurality of facial recognition models by selectively matching each facial image within the extremely large data set of facial images with at least one of the plurality of facial recognition models.

8. The method of claim 7 wherein increasing the facial matching model accuracy associated with each of the plurality of facial recognition models comprises:

computing a correlation between a dataset facial image within the extremely large data set of facial images and a most closely matching facial image within each of the plurality of facial recognition models;

determining a least closely matching facial image associated with a farthest correlation between the dataset facial image and each of the most closely matching facial images; and inserting the dataset facial image into the facial recognition model associated with the least closely matching facial image.

9. The method of claim 7 wherein increasing the facial matching model accuracy associated with each of the plurality of facial recognition models comprises:

reducing a time associated with a training of the facial recognition modeling system by load balancing the extremely large data set of facial images across the plurality of facial recognition models while improving the facial matching accuracy associated with each of the plurality of facial recognition models.

* * * * *